United States Patent [19]

Shiga et al.

[11] Patent Number: 5,450,606
[45] Date of Patent: Sep. 12, 1995

[54] SYSTEM FOR DYNAMICALLY EXCHANGING AND MATCHING REVISION INFORMATION BETWEEN HOST AND TERMINAL

[75] Inventors: Shoji Shiga, Tokyo; Kunihiro Katagiri, Hyogo, both of Japan

[73] Assignee: NEC Corporation, Tokyo, Japan

[21] Appl. No.: 57,474

[22] Filed: May 6, 1993

[30] Foreign Application Priority Data

May 8, 1992 [JP] Japan ................................ 4-141942

[51] Int. Cl.6 .............................................. G06F 15/18
[52] U.S. Cl. .................................. 375/800; 395/700; 364/260; 364/284; 364/286; 364/DIG. 1
[58] Field of Search ............... 395/800, 700, 650, 600, 395/500, 275, 200; 364/191–194

[56] References Cited

U.S. PATENT DOCUMENTS

| | | | |
|---|---|---|---|
| 4,999,766 | 3/1991 | Peters et al. | 395/600 |
| 5,051,892 | 9/1991 | Ferree et al. | 395/325 |
| 5,062,059 | 10/1991 | Youngblood et al. | 364/521 |
| 5,228,137 | 7/1993 | Kleinerman et al. | 395/500 |
| 5,269,014 | 12/1993 | Ogino | 395/500 |

*Primary Examiner*—Alyssa H. Bowler
*Assistant Examiner*—Alpesh M. Shah
*Attorney, Agent, or Firm*—Foley & Lardner

[57] ABSTRACT

A micro mainframe link software for associated processing of this invention allows complete compatibility for all the combinations of the host, work station and asset revisions to be assured. When the program is started, the revision information is dynamically exchanged between a host station-side program and a work station side program to take the matching therebetween into account to assure the combinations of all the revisions of the host and work station; and when the asset is executed, both of the host and work station is temporarily returned to the same revision condition as when the asset is developed by a work station side asset revision reading module so that the compatibility can be assured to all the asset revisions.

6 Claims, 4 Drawing Sheets

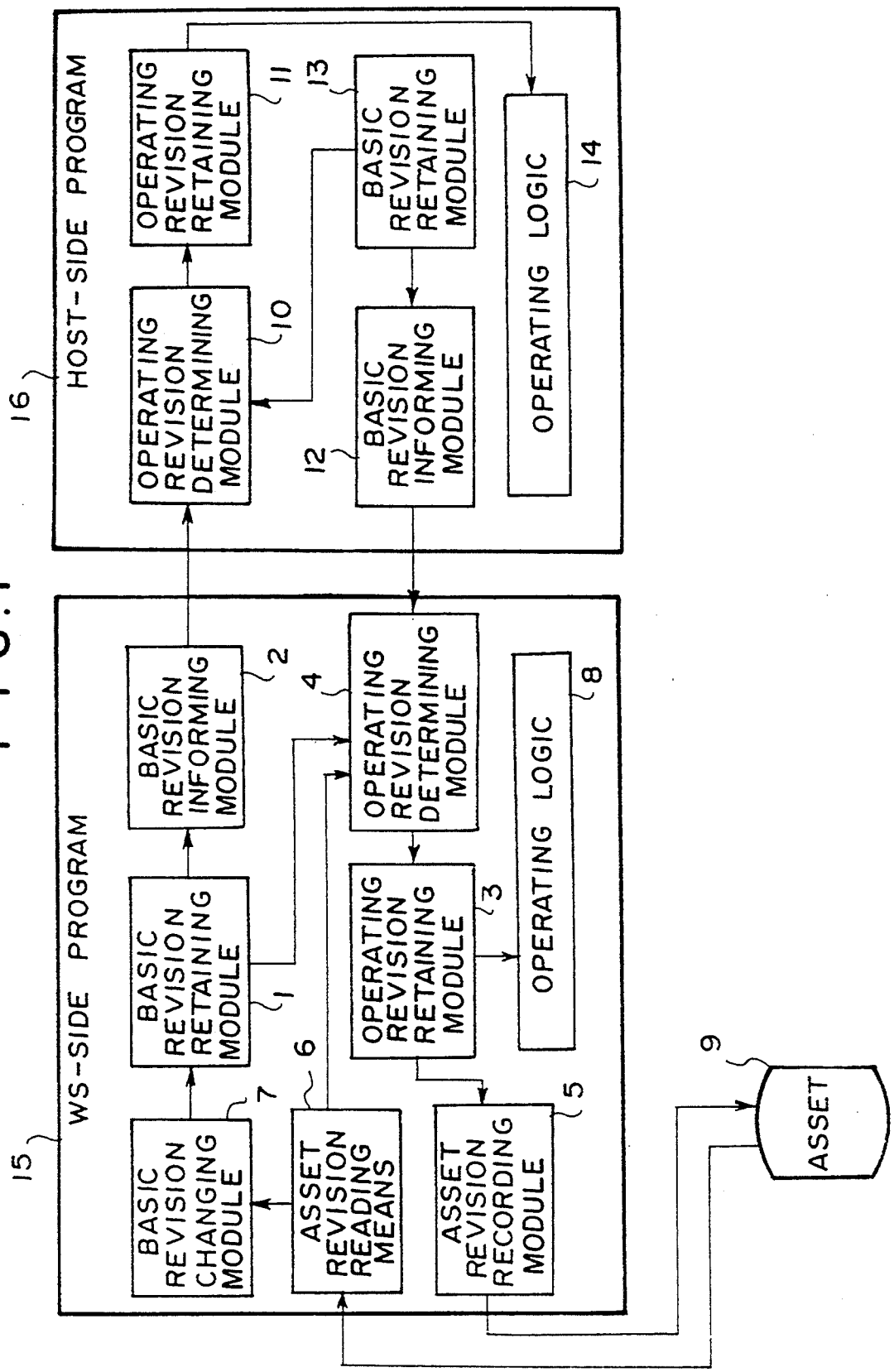

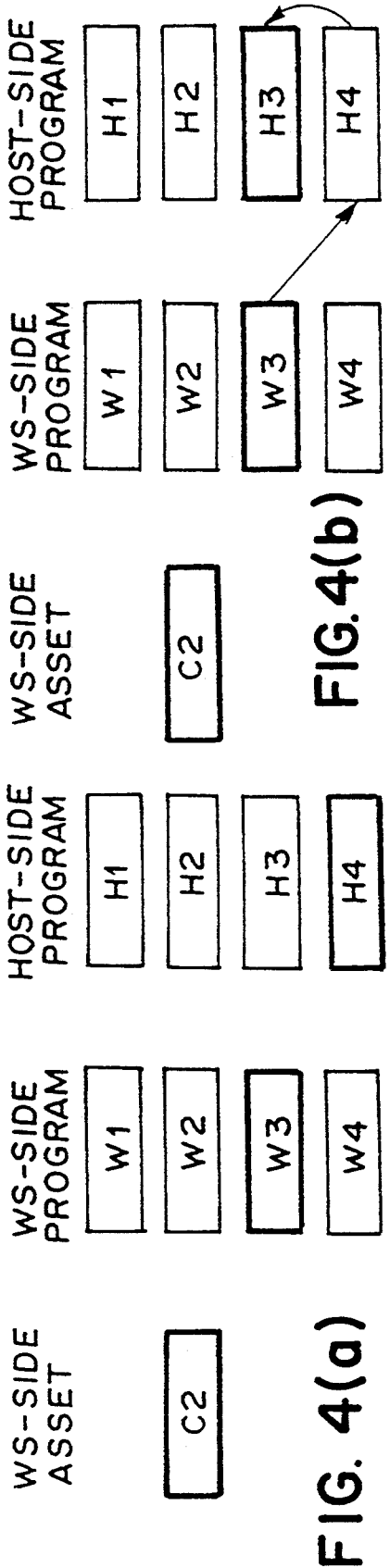
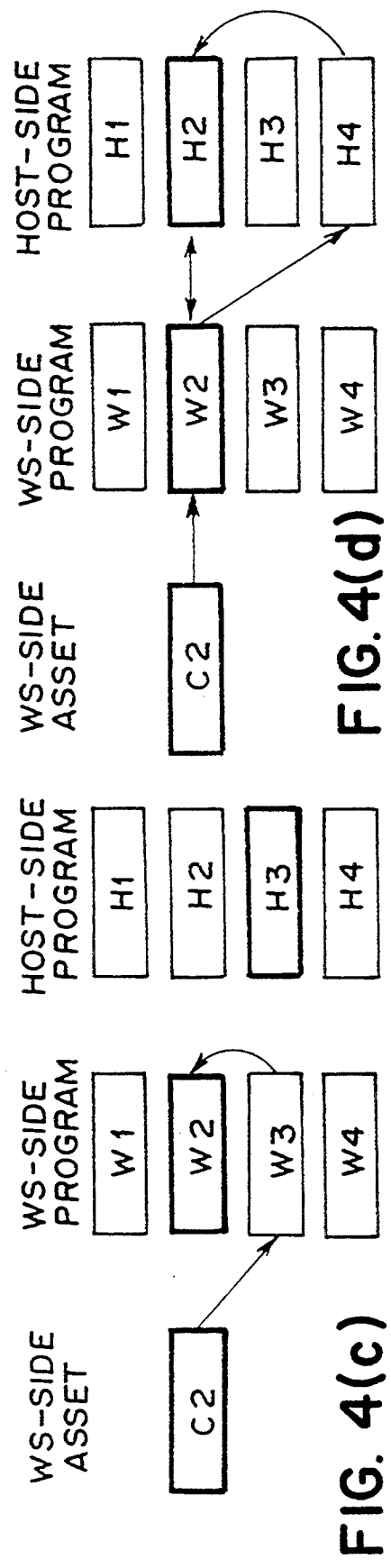
FIG. 4(a)  FIG. 4(b)  FIG. 4(c)  FIG. 4(d)

SYSTEM FOR DYNAMICALLY EXCHANGING AND MATCHING REVISION INFORMATION BETWEEN HOST AND TERMINAL

BACKGROUND OF THE INVENTION

The present invention relates to a system for dynamically exchanging revision information between host and terminal in a micro mainframe link software such as a screen editor, tabulation soft, database EUF, micro mainframe, in which when a host station-side program and a work station (hereinafter referred to as "WS") side program each comprise a plurality of revisions, the system assures a complete compatibility for all combinations of the host-WS revisions and all combinations of their assets while realizing the greatest possible function which may be displayed by those combinations.

In a micro mainframe link software in a system in which the host and the WS or the like are distributed and linked, a problem often arises how the revisions of the host station-side software and the WS-side software should be matched. When each has a plurality of revisions, the following systems are available conventionally:

a. one which restricts the matching range without a specific matching device;
b. one which assures matching by statistically setting parameters while the system is arranged; and
c. one which makes either one of the host station-side program and the WS program assure matching by informing the revision information in one-way manner.

According to the foregoing conventional systems, it is difficult to assure a fine matching. Specifically, the conventional systems a and c restricts the matching range although there is a more or less difference in it. Further, although, in the system b, there is no restricted matching range, it is difficult to return the WS-side or host station-side program dynamically to the same condition as when the assets are developed on the WS or host by users.

SUMMARY OF THE INVENTION

An object of the present invention is to eliminate such a drawback and to provide a system for dynamically exchanging the revision information between the host and the terminal which takes matching of the revision information between the host and the WS into account by exchanging it when the program is started and returns both of the host and the WS temporarily to the same revision condition as the assets are developed to assure a complete compatibility between all the combinations of revisions for the host versus WS and all the combinations of asset revisions while realizing the greatest possible function which can be displayed by those combinations.

According to the present invention, there is provided a system for prosecuting a micro mainframe link software in which a host program and a work station program are linked together by dynamically exchanging revision information between a host station and a work station comprising:

means for retaining a basic revision of said work station-side program;

means for recording a work station-side operating revision corresponding to the revision of an asset developed on said work station-side program as an asset revision;

means for informing said work station-side basic revision from said work station-side program to said host station-side program;

means for retaining a basic revision of said host station-side program;

means for receiving said basic revision of said work station-side and determining a operating revision of said host-side program corresponding to said basic revision of said work station-side program with reference to said basic revision of said host-side program;

means for retaining said host station-side operating revision determined by said determining means;

means for informing said host station-side basic revision from said host-side program to said work station-side program;

means for reading said asset revision when an asset developed on said work station-side program is executed;

means for receiving either said basic revision of the host station-side program or said asset revision of said work station-side program to accordingly determine an operating revision of said work station-side program; and means for changing said work station-side basic revision temporarily to said asset revision.

That is, the system for dynamically exchanging the revision information between the host and the terminal according to the present invention has an advantage that when the host station-side program and the WS-side program each have a plurality of revisions, a complete compatibility can be assured between all the possible combinations of the host, WS and asset revisions while the greatest possible function can be achieved by those combinations.

The present invention will be described in detail with reference to the accompanying drawings.

BRIEF DESCRIPTION OF THE DRAWINGS

FIG. 1 is a block diagram illustrating the system for dynamically exchanging the revision information between the host and the terminal according to a specific embodiment of the present invention;

FIGS. 4(a) to 4(d) show the asset executing operation according to the embodiment of FIG. 1.

DETAILED DESCRIPTION OF THE PREFERRED EMBODIMENT

Figure 2B:
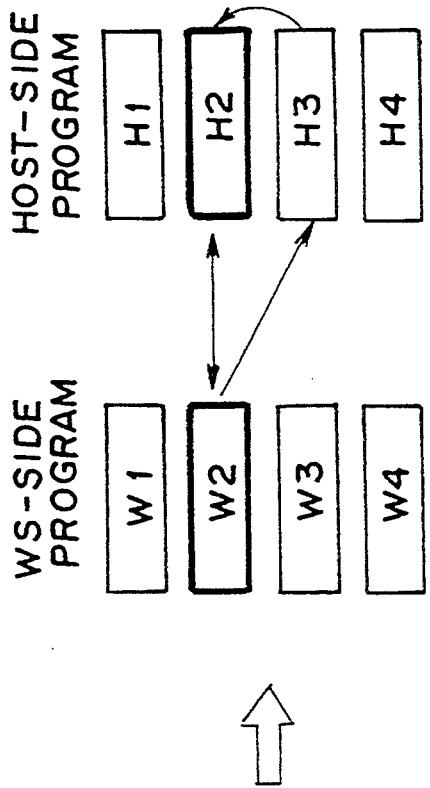
FIGS. 2(a) and 2(b) show the normal operation according to the embodiment of FIG. 1.

FIG. 1 of the drawings is an illustration of the steps executed by the system for dynamically exchanging and matching revision information between host station and work station. The left hand side of FIG. 1 depicts a WS-side program 15 comprising the following modules: a module 1 for retaining the WS-side basic revision; module 2 for informing the WS-side basic revision; module 3 for retaining the WS-side operating revision; module 4 for determining the WS-side operating revision; module 5 for recording the WS-side asset revision; module 6 for reading the WS-side asset revision; a module 7 for changing the WS-side basic revision; a WS-side operating logic 8; and a WS-side asset 9. The right hand side of FIG. 1 depicts a host-side program 16 comprising the following modules: a module 10 for determining the host station-side operating revision; module 11 for retaining the host station-side operating revision; module 12 for informing the host station-side basic revision; module 13 for retaining the host station-side basic revision; a host side operating logic 14; a WS-side program 15; and a host station-side program 16.

The system of this embodiment is a tool for operating a database which utilizes a micro mainframe link. Four revisions are currently commercially available together with the WS-side program and the host station-side program. Each revision at the WS-side is labeled W1, W2, W3 and W4, and the revisions at the host station-side are labeled H1, H2, H3 and H4. Let us assume that although the optimum combination comprises the ones assigned with the same number such as W1-H1, other combinations are also assured to operate.

Further, it is assumed that the database operating tool has a function to register routine operations to the WS-side file as a catalog and that the catalog is left as the asset in each revision. It is assumed that, within the asset, the revisions, when it is prepared, are recorded and that the revisions are C1, C2, C3 and C4. It is also assumed that the revisions are assured to operate completely on the WS side and host station-side programs which are higher in the order of revision.

Figure 2A:
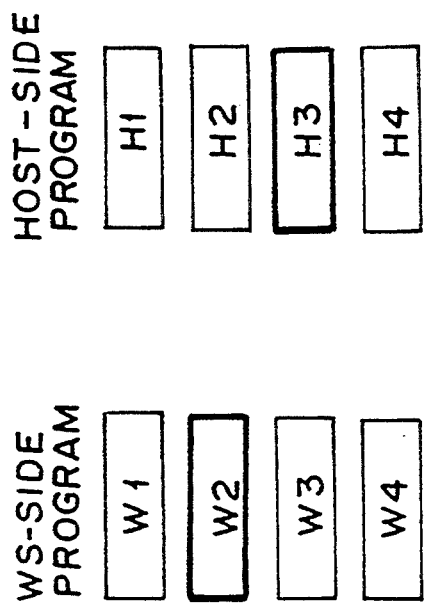

Now, let us take a case in which the WS-side program revision is W2 and the host station-side program revision is H3, as shown in FIG. 2(a), by way of example, to describe the operation.

With the database operating tool, the host station-side program 16 is first activated and, next, the WS-side program 15 is activated. The WS-side basic revision retaining module 1 within the WS program also retains W2 which is the WS-side revision. The WS-side basic revision informing module 2 takes out the revision W2 from the WS-side basic revision retaining module 1 to inform to the host station-side program 16. A host station-side operation revision determining module 10 receives the WS-side revision W2 from the WS-side basic revision informing module 2.

Next, the host station-side operating revision determining module 10 takes out the revision H3 from the host station-side basic revision retaining module 13 to compare with the W2 received from WS side. In this case, since W is smaller than H, the host station-side operating revision determining module 10 determines the host operating revision to H2, which is smaller. The host station-side operating revision retaining module 11 retains the H2.

The host station-side basic revision retaining module 13 within the host station-side program retains H3, which is the host side revision. The host station-side basic revision informing module 12 takes out the revision H3 from the host station-side basic revision retaining module 13 to inform to the WS-side program 15. The WS-side operating revision determining module 4 receives the host station-side revision H3 from the host station-side basic revision informing module 12. Next, the WS-side operating revision determining module 4 takes out the revision W2 from the WS-side basic revision retaining module 1 to compare with H3 received from the host. In this case, since W is smaller than H, the WS-side operating revision determining module 4 determines the WS operating revision as W2, which is the basic revision. The WS-side operating revision retaining module 2 retains the W2.

The WS-side operating logic 8 references to the WS-side operating revision W2 which is retained by the WS-side operating revision retaining module 3 to operate corresponding to the revision. Further, the host side operating logic 14 references to the host station-side operating revision H2 retained by the host station-side operating revision retaining module 11 to operate corresponding to the revision. As a result, as shown in FIG. 2(b), an optimum combination W2-H2 can be achieved. The foregoing example relates to a case in which the host station-side program revision is higher than the WS-side program revision but, also in the opposite case, in accordance with a similar processing, it is possible to simulate an operation equivalent to that of the optimum combination.

Next, a case in which the routine processes are left to the WS-side file as the catalog with the combination is considered. Although a log to be operated can be registered into the file as the catalog by utilizing the function of the W$ program, at this time, a current operating revision is recorded into the file as the asset revision of the catalog. A mechanism by which the asset revision is recorded is hereinafter described.

Figure 3:
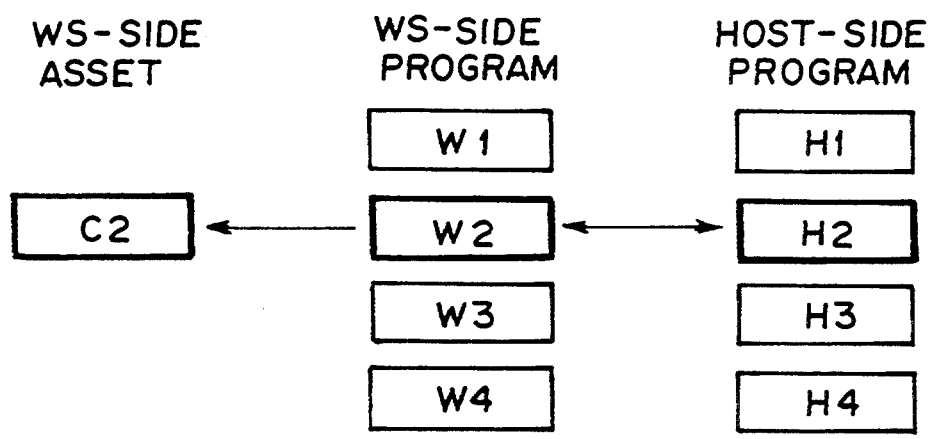
FIG. 3 shows the asset collecting operation according to the embodiment of FIG. 1.

When the catalog file is prepared, the WS-side asset revision recording module 5 references to the WS-side operating revision W2 retained by the WS-side operating revision retaining module 3 to record C2 corresponding to the value into the file as the asset file. Since the WS-side operating revision, as described earlier, also depends not only on the WS-side basic revision, but also on the host station-side basic revision, the asset revision will be recorded taking both revisions of the WS-side program 15 and the host station-side program 16 into account. FIG. 3 illustrates the operation.

Finally, a case in which both programs of the WS-side program 15 and the host station-side program 16 are each shifted upwardly for revision, one by one, from the foregoing state, that is, the asset of the foregoing revision C2 is executed on the combination of W3-H4 is described.

When, as shown in FIG. 4(a), the WS-side basic revision is W3 and the host station-side basic revision is H4, in accordance with the foregoing mechanism, the WS-side operating revision becomes W3 and the host station-side operating revision becomes H3 as shown in FIG. 4(b), and the combination of W3-H3 is simulated.

In this condition, when the foregoing C2 catalog is executed, first, the WS-side asset revision reading module 6 reads the asset revision C2 from the catalog file. Next, the WS-side asset revision reading module 6 informs the WS-side operating revision determining module 4 of the asset revision C2. The WS-side operating revision determining module 4 receives the asset revision C2 from the WS-side asset revision reading module 6. The WS-side operating revision determining module 4 takes out the revision W3 from the WS-side basic revision retaining module 1 to compare with the asset revision C2. In this case, since W is greater than C, the WS side operating revision determining module determines the WS operating revision to W2, which corresponds to the asset revision. The WS-side operating revision retaining module 3 retains the W2. The operation so far is shown in FIG. 4(c).

The WS-side basic revision changing module 7 receives the asset revision C2 from the WS-side asset revision reading module 6 to change the WS-side basic revision retained by the WS basic revision retaining module 1 to W2 corresponding to C2. The WS-side basic revision informing module 2 takes out the revision W2 from the WS basic revision retaining module 1 to inform the host station-side program 16. The host station-side operating revision determining module 10 receives the WS-side revision W2 from the WS-side basic revision informing module 2. Next, the host station-side operating revision determining module 10 takes out the revision H4 from the host station-side basic revision retaining module 13 to compare with W2 received from the WS. In this case, since W is smaller than H, the host station-side operating revision determining module 10 determines the host station-side operating revision to H2, which is smaller. The host station-side operating revision retaining module retains the H2.

Since the WS-side operating logic 8 and the host station-side operating logic 14 follows W2 and H2 respectively, as shown in FIG. 4(d), a combination of W2-H2 is simulated. As seen from the comparison of FIG. 3 and FIG. 4(d), it is seen that the same condition C2-W2-H2 as when the asset is collected is reproduced. Thus, even if the operating logic at the WS-side or host station-side is reformed, the same WS-host combination as when the asset is collected can be reproduced so that it can be matched with the asset.

Then, the process is returned to the normal state after the asset is completed, by a similar operation as when the foregoing revision is changed, the WS-side operating revision is returned to W3 and the host side operating revision is returned to H4.

What is claimed is:

1. A computer system for prosecuting a micro mainframe link software in which a host station program and a work station program are linked together by dynamically exchanging revision information between a host station and a work station comprising:
    a first retaining means for retaining a basic revision of said work station-side program;
    means for recording a work station-side operating revision corresponding to a revision of an asset developed on said work station-side program as an asset revision;
    a first informing means for informing said work station-side basic revision from said work station-side program to said host station-side program;
    a second retaining means for retaining a basic revision of said host station-side program;
    a first receiving means for receiving said basic revision of said work station-side program and determining an operating revision of said host station-side program corresponding to said basic revision of said work station-side program with reference to said basic revision of said host station-side program;
    a second informing means for informing said host station-side basic revision from said host station-side program to said work station-side program;
    means for reading said asset revision when said asset developed on said work station-side program is executed;
    a second receiving means for receiving said basic revision of the host station-side program and said asset revision of said work station-side program and determining an operating revision of said work station-side program with reference to said basic revision of the work station-side program; and
    means for changing said work station-side basic revision temporarily to said asset revision.

2. The system according to claim 1 further comprising:
    a third retaining means for retaining said work station-side operating revision from said work station-side operating revision determining means; and
    means for supplying said work station-side operating revision to a work station-side operating logic.

3. The system according to claim 1 further comprising:
    a third retaining means for retaining said host station-side operating revision from said host station-side operating revision determining means; and
    means for supplying said host station-side operating revision to a host station-side operating logic.

4. A computer-implemented method for prosecuting a micro mainframe link software in a computer network having a host station and a work station, wherein a host station program and a work station program are linked and matched with each other by dynamically exchanging revision information between the host station and the work station, said method comprising the steps of:
    (a) retaining a basic revision of said work station-side program;
    (b) recording a work station-side operating revision corresponding to the revision of an asset developed on said work station-side program as an asset revision;
    (c) informing said work station-side basic revision from said work station-side program to said host station-side program;
    (d) retaining a basic revision of said host station-side program;
    (e) receiving said basic revision of said work station-side and determining an operating revision of said host station-side program corresponding to said basic revision of said work station-side program with reference to said basic revision of said host station-side program;
    (f) informing said host station-side basic revision from said host station-side program to said work station-side program;
    (g) reading said asset revision when said asset developed on said work station-side program is executed;
    (h) receiving said basic revision of the host station-side program and said asset revision of said work station-side program and determining an operating revision of said work station-side program with reference to said basic revision of the work station-side program; and
    (i) changing said work station-side basic revision temporarily to said asset revision.

5. The method according to claim 4, further comprising the steps of:
    retaining said work station-side operating revision obtained from said determining of said operating revision of said work station-side program; and
    supplying said station-side operating revision to a work station-side operating logic.

6. The method according to claim 5, further comprising the steps of:
    retaining said host station-side operating revision obtained from said determining of said operating revision of said host station-side program; and
    supplying said station-side operating revision to a host station-side operating logic.

* * * * *